United States Patent [19]
Lefkoff

[11] 3,974,653
[45] Aug. 17, 1976

[54] THERMODYNAMIC MOTOR WITH CONSTANT ROTATING POWER SHAFT DRIVEN BY POWER SOURCES WITH INCONSISTENT CYCLES POWERED BY A TEMPERATURE DIFFERENTIAL CAUSED BY THE EVAPORATION OF WATER

[76] Inventor: Charles Berry Lefkoff, P.O. Box 80923, Chamblee, Ga. 30341

[22] Filed: Jan. 22, 1975

[21] Appl. No.: 542,922

[52] U.S. Cl. .................. 60/716; 60/531; 60/641; 60/675
[51] Int. Cl.² ............ F03G 7/04; F01K 25/04
[58] Field of Search ............ 60/530, 531, 698, 716, 60/720, 641

[56] References Cited
UNITED STATES PATENTS

| | | | |
|---|---|---|---|
| 2,384,168 | 9/1945 | Hillery | 60/641 |
| 2,398,471 | 4/1946 | Short et al. | 60/641 |

*Primary Examiner*—Allen M. Ostrager

[57] ABSTRACT

A motor offering usable energy which comprises a number of power sources which are powered solely by their reaction to the evaporation of water or by their reaction to the atmosphere's normal characteristic of temperature decrease with increase in elevation.

2 Claims, 7 Drawing Figures

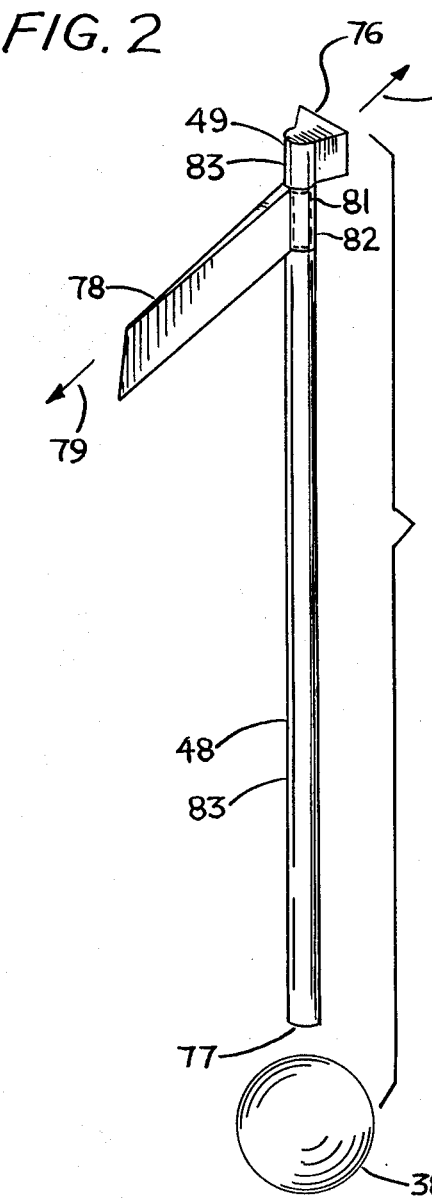
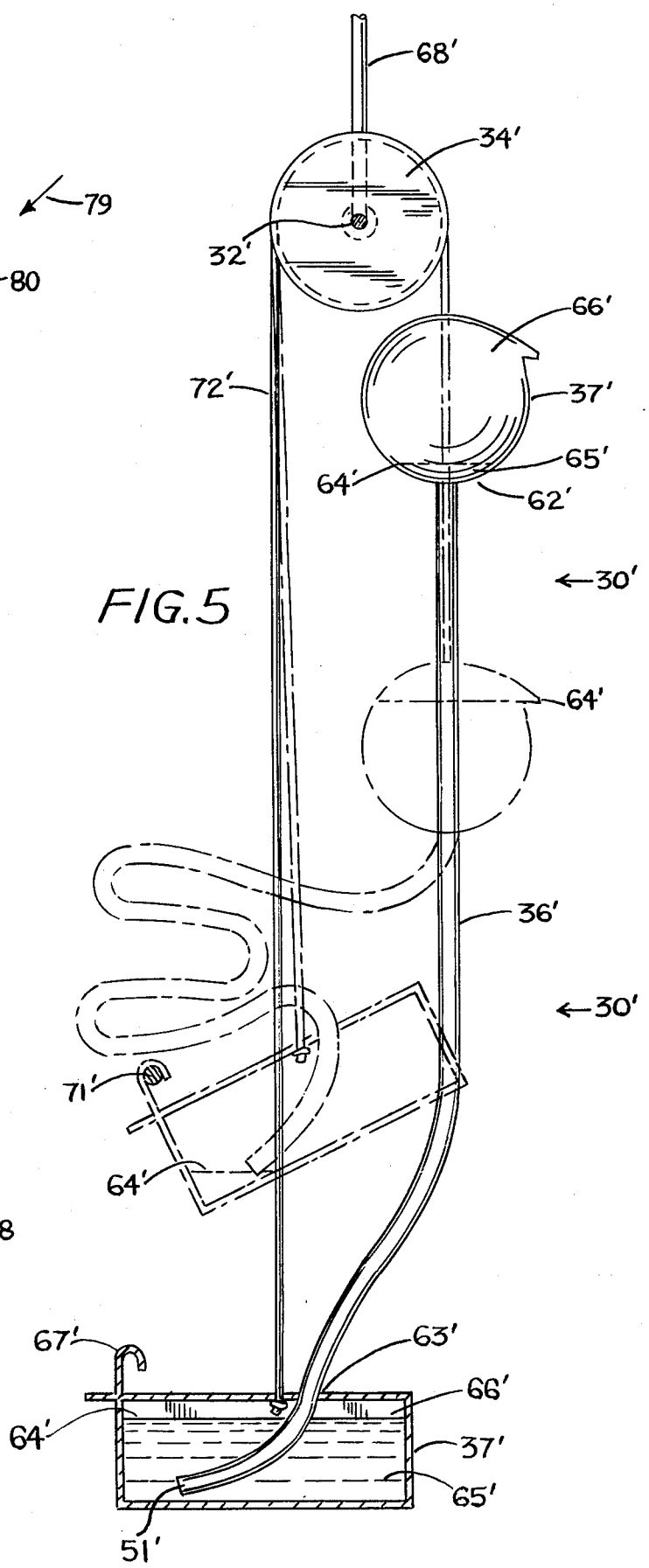

THERMODYNAMIC MOTOR WITH CONSTANT ROTATING POWER SHAFT DRIVEN BY POWER SOURCES WITH INCONSISTENT CYCLES POWERED BY A TEMPERATURE DIFFERENTIAL CAUSED BY THE EVAPORATION OF WATER

BACKGROUND OF THE INVENTION

1. Field of the Invention

This invention relates to thermodynamic motors and to the conversion of a heat differential, produced by the evaporation of water or by the natural differential in the atmosphere, into usable energy and in particular to the generation of electricity.

2. Prior Art

Several U.S. patents have been issued for various thermodynamic power sources of the type shown in FIG. 1 having two chambers connected by a tube forming an airtight container containing a volatile liquid and its vapor. The tube is mounted in a near vertical position on a pivot, and the end of the tube extends into the lower chamber and is submerged in the liquid. When the higher chamber is the coolest chamber, the liquid moves from the lower chamber through the tube to the higher chamber causing the upper chamber to over balance the lower chamber. The container pivots towards a balance position at which the end of the tube is no longer submerged in the liquid in the lower chamber. This allows the liquid to flow back to the lower chamber which causes the container to pivot back to the original position.

U.S. Pat. Nos. for inventions of this type are 2,402,463 to Sullivan - June 18, 1946, 2,398,471 to Short & Brown - Apr. 6, 1946 and 2,384,168 to Hillery - Sept. 4, 1946. The best known of such devices is made to look like a bird and is sold as a novelty. The upper chamber is made to resemble the head of the bird and is covered by an absorbent material and has a beak made of absorbent material extending from the upper chamber. A container of water is positioned so that when the bird rocks, the beak goes into the water which is absorbed by the beak. After the bird rocks back to the original position the evaporation of the water cools the upper chamber. This slight temperature differential between the two chambers is enough potential energy to keep the bird rocking as long as the water level in the container is high enough to wet the beak.

No method before now has been used to harness or take off the energy made available by these power sources; nor have these power sources been used to perform work other than moving objects such as signs which are tightly attached to the container and which move with the container. This lack of use of the power source is due to the inconsistent rocking of the containers. The frequency of the cycle of these devices varies from one cycle to another as does the amount of force with which these devices move.

Presently electric power plants are powered by energy obtained from the destructive consumption of fuels which pollutes the air or has the potential of radiation contamination or powered by energy obtained from moving bodies of water which are limited to a small portion of the earth's topography.

SUMMARY OF THE INVENTION

The invention uses the inconsistent movements of power souces powered solely by the evaporation of water to rotate a power rod with consistency. This is accomplished by a mechanism that permits only one power source to begin pivotting at a time and that provides that there is always a container pivotting. A rachet provides that the power shaft turns only when a container pivots in one direction which causes the power shaft to rotate in one direction. This rotation of the power shaft can drive an energy consuming device such as an electric generator, pump, vehicle etc.

This invention also utilizes a method of making the force of each cycle uniform by requiring each container to have enough liquid in its upper chamber to over balance a weight before pivotting.

This invention also provides the use of new similar types of power sources to move the power shaft including one power source in which the container rotates rather than rocking, and including two in which the chambers are supported by a cable which moves a pulley rather than pivotting, and including two in which the two chambers alternate being at the higher altitude.

This invention also provides for cooling of the upper chamber with cool air from a higher altitude including a device that moves this air to a location at a lower altitude by the power of the wind.

With the use of this invention, Power plants can produce electricity without the destructive consumption of fuel, without pollution, and without the threat of radioactive contamination; and at the same time these power plants can be built on almost any topography.

BRIEF DESCRIPTION OF DRAWINGS

FIG. 2 is a perspective view of a device which facilitates the movement of air from a higher altitude to a lower altitude.

FIGS. 5, 6, and 7 are each a right view of a different new power source which can be used in place of the power source in FIG. 1 to drive a motor of the type shown in FIGS. 3 and 4.

DESCRIPTION OF THE PREFERRED EMBODIMENTS

Figure 1:
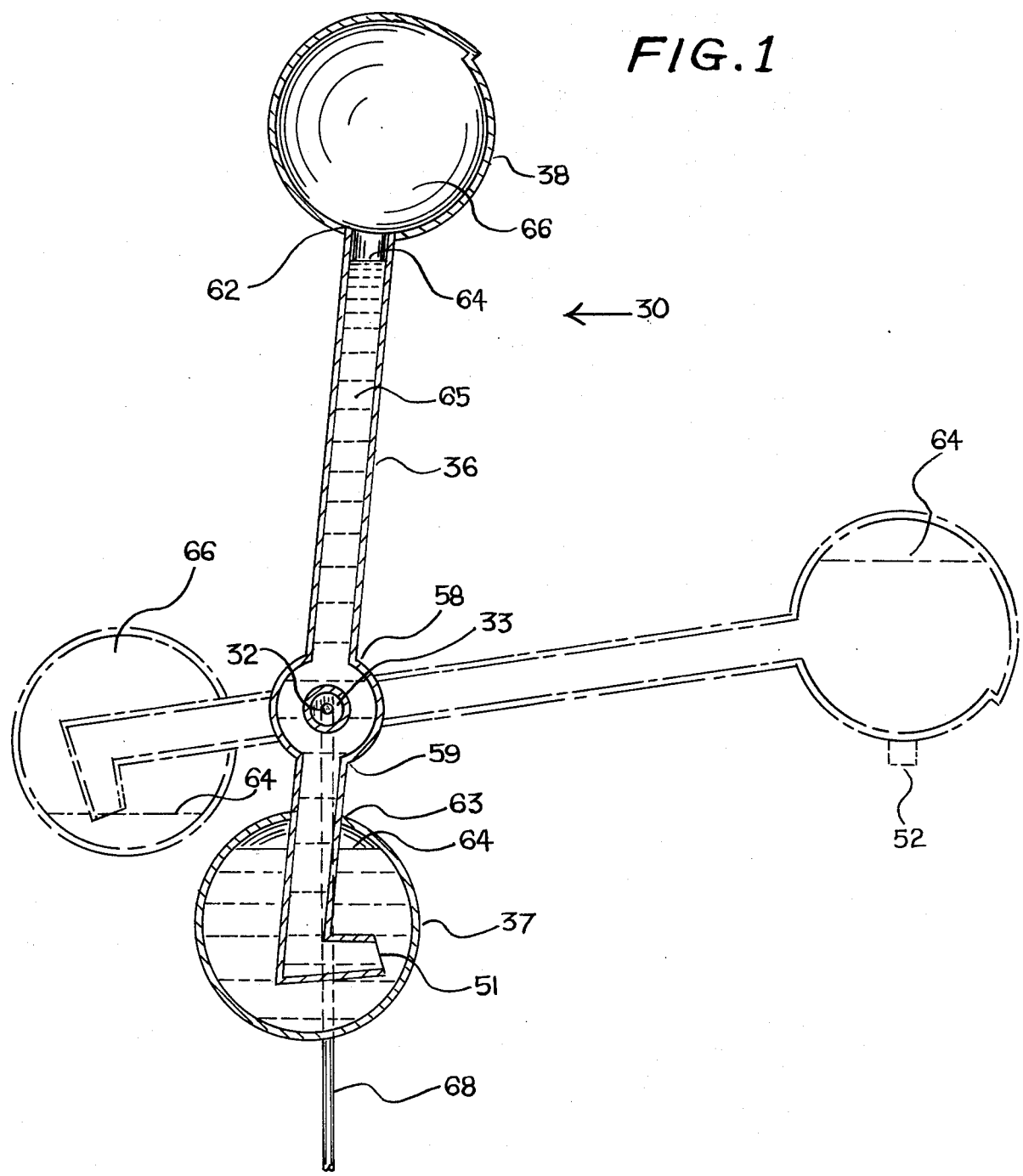
FIG. 1 is a right side view of a power source similar to the prior art.

In FIG. 1 a power source 30 similar to types in patents mentioned herein comprises a sealed hollow member such as one having three parts; a tubular member such as a tube 36, a first hollow member such as a tank called the anterior tank 38, and a second hollow member such as a tank called the posterior tank 37. The anterior tank 38 is joined to one end of the tube 36 at 62 in an air tight manner such that there is an opening in the anterior tank 38 providing communication with the tube 36. The other end of the tube 36 extends through an opening 63 in the posterior tank 37. The portion of the posterior tank 37 around the opening 63 is joined in an airtight manner to the tube 36 such that the tube and the two tanks 37 & 38 form a sealed hollow member which can be called the container.

The power source 30 also comprises a means of facilitating movement of the container such as the means having three parts: a drum 33, a power shaft 32, and a supporting member such as a stand 68. The container is attached to the drum 33 in a way such that the center of rotation of the container is in the center of the width of the tube 36 such as constructing the tube 36 so that it splits into two tubes at 58 that fit tightly around the drum 33 and rejoin at 59 into one tube 36. The power shaft 32 is extended through a hole in the center of the drum 33 and is supported at each end by a stand 68. If the power shaft 32 fits loosely through the drum 33, the container with the drum can rotate about the power shaft 32. If the drum 33 is not free to move with respect to the power shaft 32 and if the power shaft 32 is connected to the stand 68 in a way that allows the power shaft to rotate with respect to the stand 68, then the container with the drum 33 and the power shaft 32 can rotate with respect to the stand 68.

The power source also comprises a first fluid such as a volatile liquid 65 within the container and also comprises a second fluid within the container, that is less dense than the first fluid, such as the vapor 66 of the volatile liquid 65. Various examples of these two fluids as well as methods of placing them in the container are described in the mentioned patents and in U.S. Pat. No. 3,659,215 to Massopust, Nov. 17, 1953. The liquid 65 and vapor 66 meet at 64. Where ever the liquid 65 and the vapor 66 meet, the vapor 66 exerts a force on the liquid 65. When this force is in equilibrium throughout the container, the liquid 65 does not move. However if these forces at two different meeting places 64 are not in equilibrium, the liquid will move towards the portion of the vapor exerting the least force on the liquid 65.

The power source also comprises a means of effecting enough force differential in the vapor 66 in some or all portions of the container such that the container will continue to change positions. For example when the temperature of the posterior tank 37 is higher enough than the temperature of the anterior tank 38, the liquid 65 will move towards the anterior tank 38. The solid lines show the container in the original position while the liquid is not moving. As the force exerted by the vapor 66 in the tube becomes lesser enough, the liquid will move into the anterior tank 38 causing the container to be off balance and move towards a new balance position and to the stop position shown by the broken lines in FIG. 1.

The power source also comprises a means of compelling the container to continue to change positions by preventing the container from remaining in the stop position, which it would do if the end 51 of the tube 36 extending into the posterior tank 37 remained completely submerged in the liquid 65. Such a means comprises the tube's 36 construction being such that enough of the tube's end 51 is above the liquid 65, when the container is in the stop position, such that enough vapor 66 in the posterior tank 37 moves through the tube 36 to the anterior tank 38 to allow enough liquid 65 to move into the posterior tank 37 to move the container towards the original position such that this cycle will continue as long as the means of effecting a great enough differential exists. In order to assure that the container is moving slow enough at the stop position to allow the liquid to flow into the posterior tank, the pivot point must be at a proper position on the tube 36 or a means of stopping the container at the stop position, such as a stop block, 52, may be used.

Means of changing the temperature of one or both tanks 37 & 38 could be exposing the anterior tank 38 in the original position to air at a higher altitude in the atmosphere which is normally cooler than air closer to the ground which determines the temperature of the posterior tank 37 in the original position. One such means of exposing is building a container with tube 36 which is long enough such that its top is at this high altitude when the container is in the original position. Another such means is the use of a device that will facilitate the movement of air from a higher altitude to the vicinity of the anterior tank 38. Such a device shown in FIG. 2 comprises a tubular member such as a pipe 83 with a higher opening 76, a lower opening 77, and means of facilitating the change in the direction in which the higher opening 76 is facing, such as constructing the pipe 83 in two parts such that the top end 81, shown by broken lines, of the lower part 48 of the pipe 83 is slightly smaller in diameter than the bottom end 82 of the higher part 49 of the pipe 83 such that the top end 82 will slide into the bottom end 82 firmly to allow the higher part 49 to revolve with respect to the lower part 48. The device also comprises a means of changing the direction in which the higher opening 76 faces so that it will face into the wind. Such a means is a blade 78 firmly attached to the higher portion 49 such that the blade 78 faces in the opposite direction 50 from the direction 80 in which the higher opening 76 is facing. The wind forces the blade 78 to face the same direction 79 as the wind is blowing in so that the higher opening 76 will face into the wind. The wind will force air at the higher altitude into the higher opening 76, through the pipe 83, out of the lower opening 77, and into contact with the anterior tank 38 in the original position. Another such means of changing the temperature is placing a pan supplied with water in a position such that the anterior tank 38, when in the original position, is in physical contact with the pan such that the evaporation of the water will cool the pan which will in turn cool the anterior tank 38. Another such means of changing the temperature is running tap water on the posterior tank 37 in freezing weather.

For purposes of clearer description the containers are drawn as if they were made of a transparent material such as glass. The most effective materials are those with high heat transfer properties for the tanks 37 & 38 and materials of low heat transfer properties for the tube 36.

Figure 3:
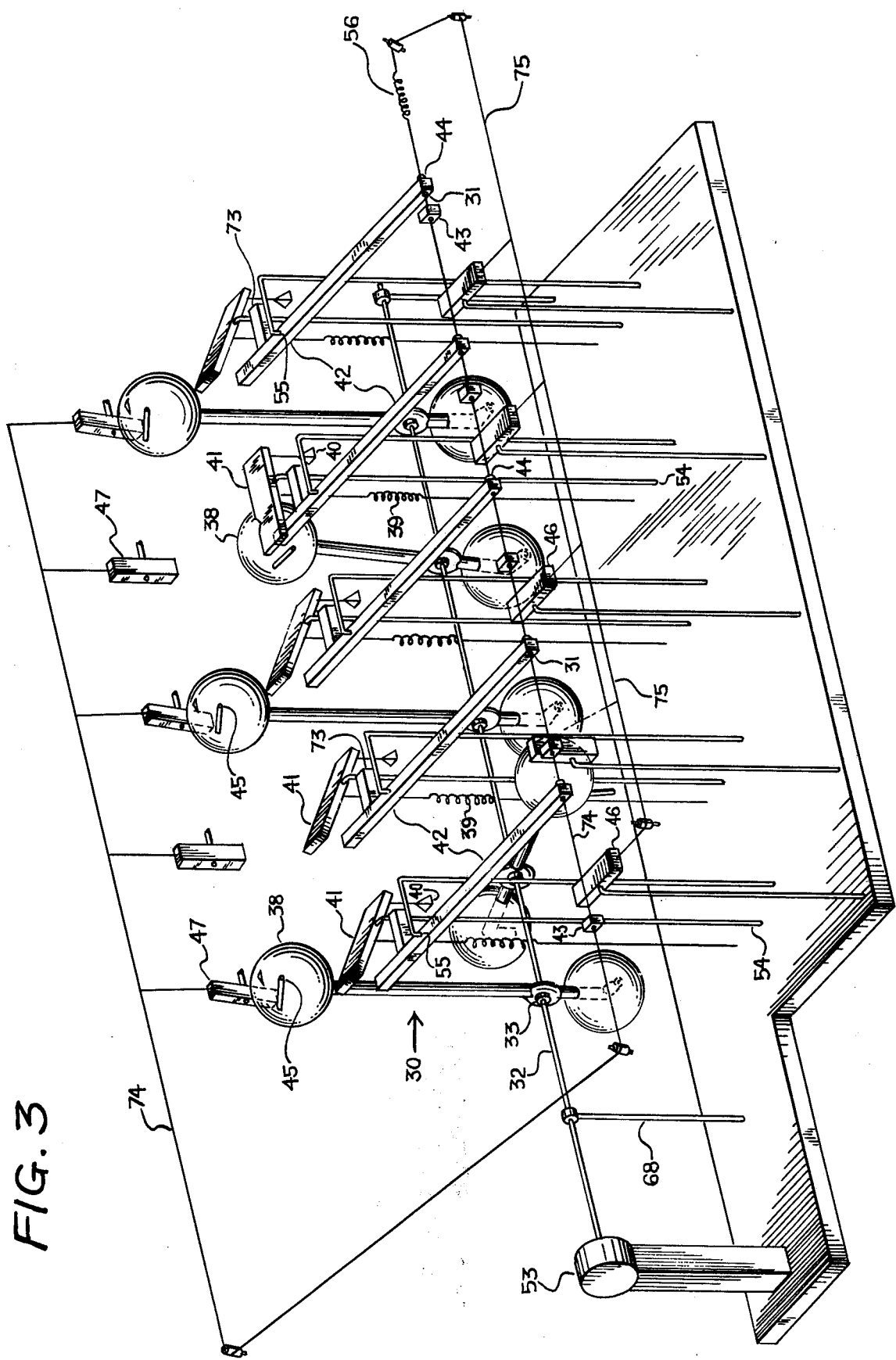
FIG. 3 is a perspective view of a motor in which a power shaft is continuously rotated by five power sources of the type shown in FIG. 1.

FIG. 3 shows an example of a motor from which power is removed in the form of usable energy which can be used to drive an energy consuming device such as a pump, electric generator, transportation vehicle etc. Such a motor comprises at least one power source 30 of a type similar to that shown in FIG. 1. FIG. 3 shows five such power sources 30. The motor also comprises a power shaft 32 common to each container that can be moved by the movement of any container. The power shaft's movement provides the usable energy to an energy consuming device 53. The motor also comprises means of converting the movement of the containers into the movement of the power shaft 32 such as a ratchet mechanism, similar to the type used between the chain and rear wheel of an "English bicycle", within each drum 33 such that when a container moves from the original position to the stop position the power shaft 32 rotates with respect to the stand 68 along with the drum 33 and the container. When a container moves from the stop position to the original position the ratchet mechanism allows this movement to have no significant effect on the movement of the power shaft 32. This causes the power shaft 32 to rotate in one direction only.

The motor also comprises means, the arresting means, of preventing at least one off balance container from moving to the stop position while at least one container is causing the power shaft 32 to move. This arresting means comprises an arresting member which comprises a lever such as a counter level 41 associated with each container, a supporting member 54 about which the counter lever 41 pivots, a first biasing member such as a spring 39 which biases the counter lever 41 to pivot in one direction, a second biasing member such as a weight 40 which biases the counter lever 41 to pivot the other way such that the spring 39 and the weight 40 together keep the end of the counter lever 41 in the path of the anterior tank 38 when the anterior tank is not in contact with the counter lever 41. However the anterior tank 38 pushes the counter lever 41 such that the counter lever 41 pivots out of the path of the anterior tank 38 as the anterior tank moves past the counter lever 41 on its way to the stop position or the original position.

Figure 4:
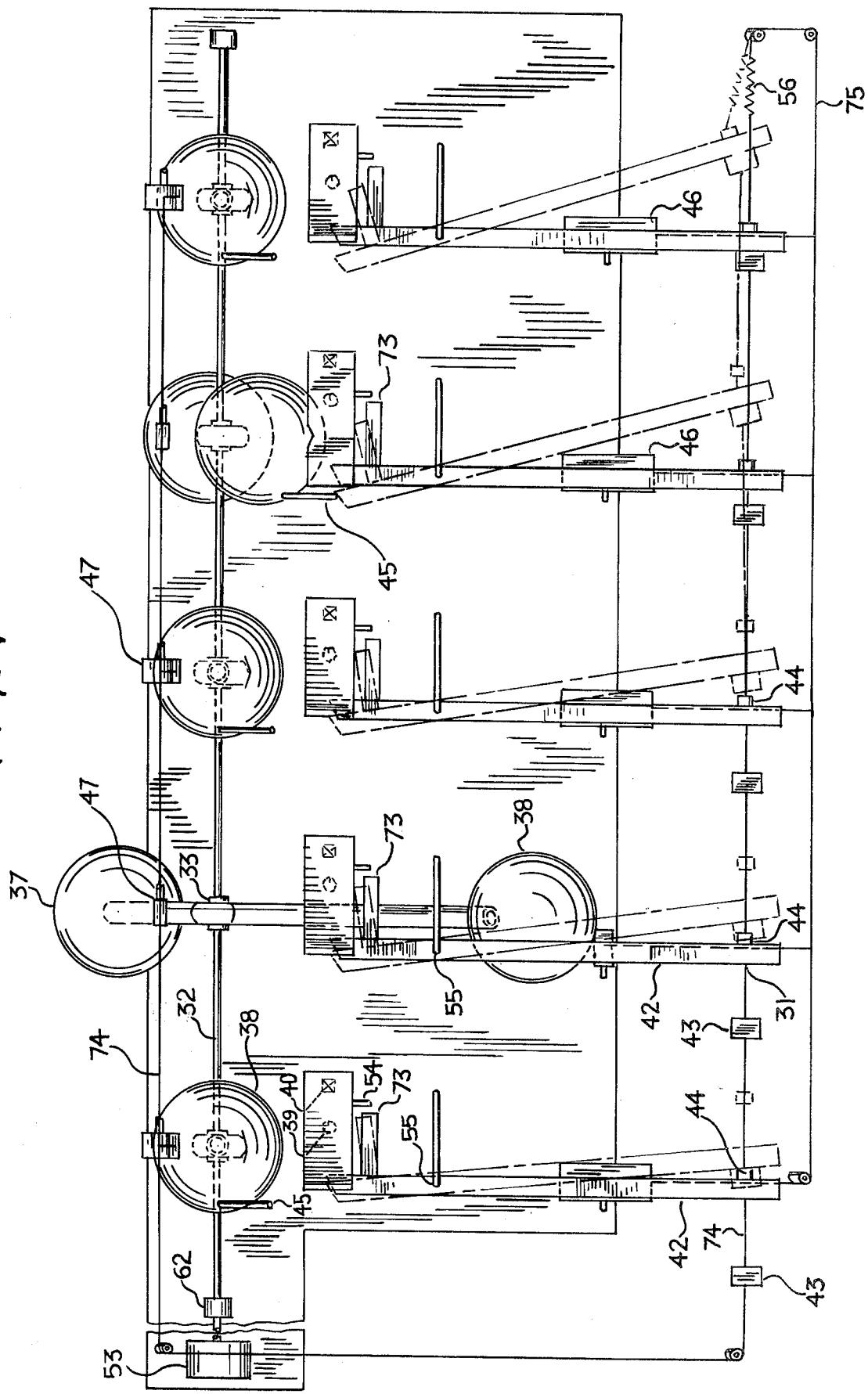
FIG. 4 is a top view of the motor shown in FIG. 3.

The arresting member also comprises a lever such as an arresting lever 42 which pivots at 55 such that when it is pivoted one way, as shown by the solid lines in FIG. 4, the arresting member is in the hold condition and the arresting lever is in the path of and under the end of the counter lever 41 which has contact with the anterior tank 38. When the arresting member is in the hold condition, a container that is in the arrest position (off balance enough to push the counter lever 41 out of its way) is prevented from moving to the stop position. In FIGS. 3 and 4 the second container from the right is in the arresting position. If the arresting lever 42 were pivoted out of the path of the counter lever 41, the arresting member would be in the release condition as shown by the broken lines of the second arresting lever 42 from the right in FIG. 4, and the container which was in the arresting position would be released to move to the stop position and move the power shaft 32.

The arresting member also comprises a hold bar 73 firmly attached to the arresting lever 42. When the arresting member changes from the hold condition to the release condition, if a container is in the arresting position the container's respective arresting lever's 42 pivot will be stopped in the release condition by the stop bar 45 which is firmly attached to the anterior tank 38 of the container; if a container is not in the arresting position the pivot of the arresting lever 42 will continue until the hold bar 73 is positioned under the counter lever 41, in which case the arresting member is in the rehold condition as shown by the broken lines of the first arresting member to the right in FIG. 4. If a container becomes off balance from the original position and if the arresting member is in this rehold condition, the hold bar 73 in the path of the counter lever 41 will prevent the container from moving past the arresting position. When the arresting member is quickly put back into the hold condition, the arresting member is in the release condition for such a short instant that the container will not move from the arresting position.

The arresting means also comprises a first activating member which comprises a hold lever 47 in the path of each anterior tank 38 such that when a container approaches the original position from the stop position the anterior tank 38 moves the hold lever 47. The first activating member also comprises a movement transfer member such as an arresting cable 74 which is strung through holes 31 in the ends of the arresting levers 42 opposite the ends which pivot into the paths of the counter levers 41. The arresting cable 74 is fits loosely though the holes 31 so that it can slide back and forth with respect to the arresting levers 42. The first activating member also comprises a hold block 44, larger than the holes 31, fastened to the arresting cable 74 to the right of each arresting lever 42. The end of each hold lever 47 (opposite the end which is pushed by the container) is attached to the arresting cable 74 such that when any anterior tank 38 pushes the hold lever on its way to the original position, the arresting cable 74 is pulled in the direction which causes the hold blocks to push the arresting levers 42 to the position of the hold condition.

The motor also comprises a means, the release means, of causing at least one off balance container to begin moving the power rod 32 before all containers have discontinued moving the power rod 32. This release means comprises a second activating member which comprises a release lever 46 in the path of each anterior tank 38 such that the release lever is moved by the anterior tank as the container approaches the stop position. The second activating member also comprises a freeing cable 75, an absorption spring 56, a release block 43 attached to the arresting cable 74 to the left of each arresting lever 42, and a stop bar 45 attached to each anterior tank 38. One end of the absorption spring 56 is attached to the end of the arresting cable 74 and the other end of the absorption spring 56 is attached to one end of the freeing cable 75. Also attached to the freeing cable 75 is each re-release lever 46 such that when an anterior tank 38 moves a release lever 46, the release lever 46 pulls the freeing cable 75 which pulls the absorption spring 56 which pulls the arresting cable 74 such that the release blocks 43 push the arresting levers 42 towards the position of the rehold condition. The release blocks 43 are positioned on the arresting cable 74 such that each one is farther to the left of its respective arresting lever 42 than the release block 43 to its right is from its respective arresting lever 42. This positioning of the release blocks 43 cause the arresting levers 42 to move into the position of the release condition one at a time from right to left. As soon as one of the moving arresting levers 42 finds a container in the arresting position, the arresting lever 42 hits the stop bar 45. This stops the movement of the arresting cable 74, and the continued movement of the freeing cable 75 is absorbed by the absorption spring 56. Only the first container from the right that is in the arresting position is released.

The speed at which the container moves to the stop position depends on the torque resistance of an energy consuming device 53 connected to the power rod 32. The speed of the containers should be such that after a first container activates the release lever 46 releasing another container to move from the arresting position, the first container will activate its hold lever 47 before the other container activates its release lever 46.

In order to maximize the torque exerted by each container on the power shaft 32 and to make the torque exerted by each container uniform, means is used to prevent an off balance container from moving from the original position all the way to the arresting position before the maximum amount of liquid has moved to the anterior tank 38. Such a means comprises the weight 40 being just small enough to be over balanced by a container with this maximum amount of liquid 65 in its anterior tank 38.

In order to assure continuous rotation of the power shaft 32, the number of containers should number more than the quotient equal to the maximum time required for a container to reach the arresting position after activating the release lever 46 divided by the minimum time required for a container to activate the release lever 46 after being released from the arresting position.

To start the motor in operation all containers should be in the arresting position, and the arresting member should be in the hold condition. The arresting cable 74 is pulled manually to move the arresting member to the release condition until a container is released. The arresting member is then manually put into the hold condition before the moving container activates the release lever 46. The motor then operates by itself.

In this motor each release lever 46 and each hold lever 47 comprises means, such as a spring in the pivot mechanism, of positioning a lever 46 & 47, after it is activated, to the same position it was in before it was activated.

The term "airtight" herein means that venting if any will be small enough such that the force differential causes the liquid's movement which causes the container to be off balance.

FIG. 5 shows the right side view of a power source 30' comprising a flexible tube 36', an anterior tank 38', and a posterior tank 37'. The anterior tank 38' is joined to one end of the tube 36' at 62' in an air tight manner such that an opening in the anterior tank 38' provides communication with the tube 36'. The other end of the tube 36' extends through an opening 63' in the posterior tank 37'. The portion of the posterior tank 37' around the opening 63' is joined in an air tight manner to the tube 36' such that the tube 36' and the two tanks 37' & 38' form a sealed container.

The power source also comprises a means of facilitating movement of the container comprising a movable member such as a pulley 34', a supporting member such as a stand 68' about which the pulley 34' can rotate, and a flexible member such as a drive cable 72'. One end of the drive cable 72' is attached to the anterior tank 38' and the other end of the drive cable 72' is attached to the posterior tank 37'. The drive cable 72' is supported by the pulley 34' which is positioned under the drivecable 72' between the anterior tank 38' and the posterior tank 37'. If either tank 37' or 38' over balances the other, the heavier tank will descend and the other tank will ascend and the pulley 34' will rotate.

Container contains a volatile liquid 65' and the vapor 66' of the liquid 65'. When the container is in the original position as shown by the solid lines, the end 51' of the tube 36' in the anterior tank 37' is below the line 64' where the liquid 65' and the vapor 66' meet.

When the temperature of some or all of the container is changed by means such as differential in temperature, such that the posterior tank 37' is warmer than the anterior tank 38', the force exerted by the vapor 66' in the posterior tank 37', which is greater than that in the anterior tank 38', forces the liquid 65' to move towards the anterior tank 38'. This causes the anterior tank 38' to over balance the posterior tank 37' such that the container moves towards a balance position.

The power source 30' also comprises a means of preventing the container from remaining in a position in which the means of changing the temperature will not cause the liquid 65' to move such that the container will be off balance. Such a means comprises a hook 67' attached to the posterior tank 37', a member such as a hook rod 71' in the path of the hook 37', and a means of keeping all of the tube 36' at an altitude between the altitude at which the ends of the tube 36' are, such as constructing the tube 36' such that it will coil if not stretched straight.

When the anterior tank 38' descends as the container moves towards a balance position the hook 67' on the ascending posterior tank 37' hooks the hook rod 71' which causes the posterior tank 37' to tilt such that at least part of the end 51' of the tube 36' in the posterior tank 37' is out of the liquid 65'. When the container is in this stop position as shown by the broken lines, the vapor 66' moves through the tube 36' to the anterior tank 38' which is still higher than the posterior tank 37' which causes the container to move back to the original position. As long as said means of temperature differential is present the cycle will continue to repeat.

A motor similar to the motor in FIG. 3 can be constructed using this power source 30' in the place of the one 30 in FIG. 1. In this motor the power rod 32' extends through a hole in the pulley 34' of each power source 30'. It 32' is supported by a stand 68' about which it can rotate. A ratchet mechanism is in the pulley 34' which turns the power shaft 32' when the anterior tank 38' is descending, but has no effect on the power shaft's movement when the anterior tank 38' is not descending. As long as at least one anterior tank 38' is descending the power shaft 32' will continuously rotate in one direction.

Figure 6:
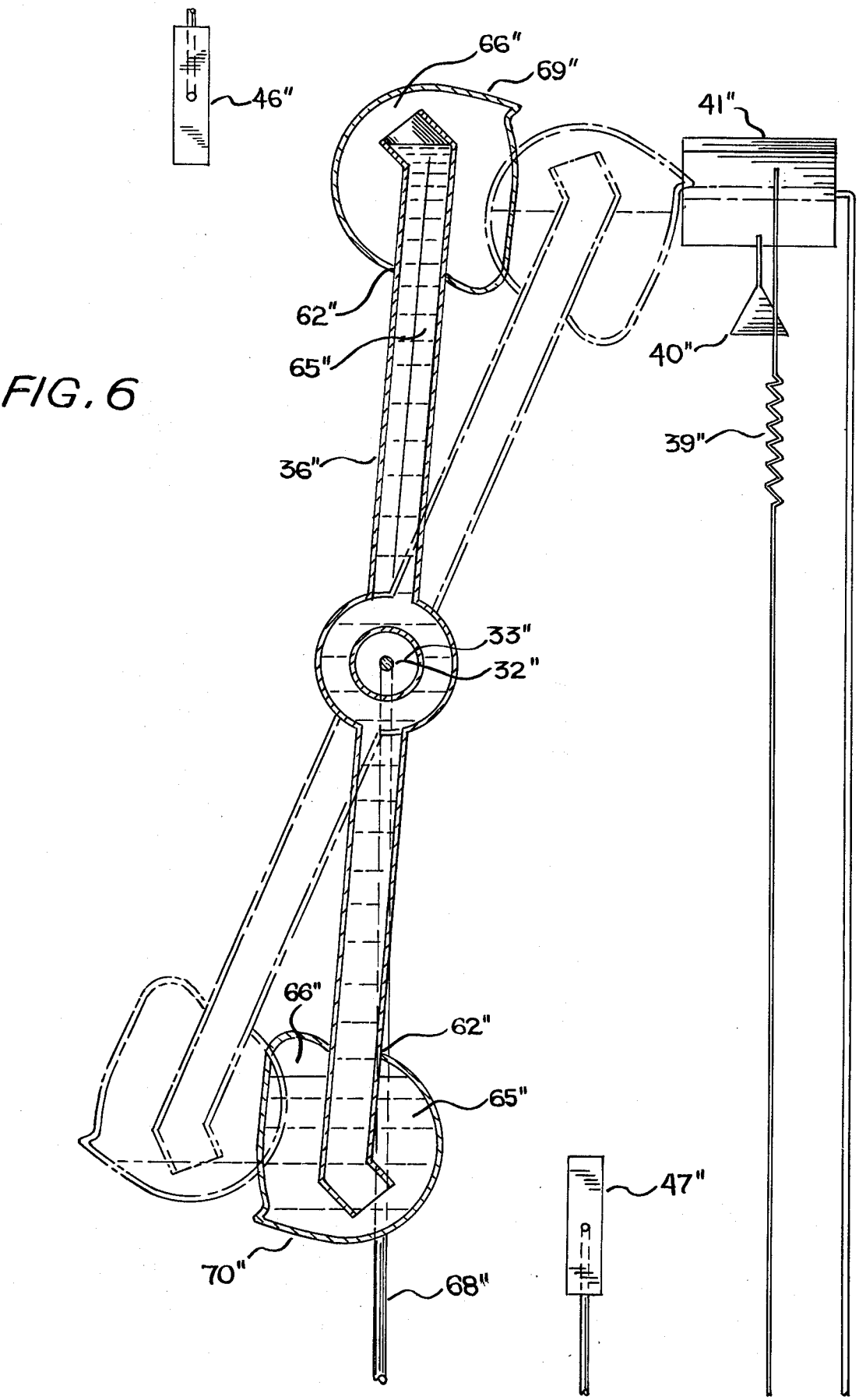

FIG. 6 shows the right side view of a power source 30" comprising a container comprising two tanks 64" & 70" which are identical, a tube 36" each end of which extends through an opening 62" in and into a different tank 69" or 70". The tube 36" is joined to each tank 69" & 70" at each opening 62" in an airtight manner such that the two tanks 69" & 70" and the tube 36" form a sealed container. The tube 36" provides communication between the tanks 69" & 70".

The power source 30" also comprises a drum 33" attached to the tube 36" at an equal distance from each tank 69" & 70" and comprises a power shaft 32" which extends through a hole in the drum 33" and is supported at each end by a stand 68" in such a way that the power shaft 32" can rotate with respect to the stand 68". The container and drum 33" may rotate either with the power shaft 32" or about it depending on whether or not the drum 33" is attached to the power shaft 32". This power source 30" has two original positions, one of which is shown by the solid lines in FIG. 6. The other original position is the position of the power source 30" with the container rotated 180°.

The power source 30" also comprises a means of force differential exerted by the vapor 66" in some or all parts of the container such that whichever tank 69" or 70" is at the highest altitude will contain the portion of the vapor 66" of lesser enough force. This causes the liquid 65" to move towards the higher tank 69". This causes the higher tank to over balance the lower tank which causes the container to rotate at the power rod 32" towards a balance position.

The power source 30" also comprises a means of compelling the container to continue to change positions by preventing the tanks 69" & 70" from moving to a balance position before enough liquid 65" has moved into the higher tank to assure that the balance position will not result in the tanks 69" & 70" being at approximately the same altitude at which the vapor 66" in both tanks would exert the same force such that no liquid 65" would move to cause the container to move. Such a means comprises a counter lever 41", a supporting member about which the counter lever 41″ pivots, a spring 39″ that biases the counter lever 41″ to pivot one way, and a weight 40″ that biases it 41″ to pivot the other way such that the spring 39″ and the weight 40″ keep one end of the counter lever 41″ in the path of the tanks 69″ & 70″ when neither tank is in contact with the counter lever 41″.

When the liquid 65″ continues to move towards the higher tank the container becomes off balance and moves towards the arresting position as shown by the broken lines. Before reaching the arresting position the higher tank 69″ comes into contact with the counter lever 41″ which is shown inclined towards the weight 40″. The higher tank 69″ biases it 41″ to pivot towards the spring 39″, and when enough liquid 65″ has moved into the higher tank 69″ to assure that equilibrium will be prevented, the higher tank 69″ over balances the weight 40″ and the container moves to the arresting position. If no other arresting member such as in the motor is present, the higher tank 69″ pushes the counter lever 41″ out of its way and continues to pivot at the power shaft 32″ until the container pivots 180° from the previous original position to the other original position of the container. The same amount of liquid is in the now lower tank 69″ as was in the lower tank 70″ of the previous original position.

The means of force differential again makes the force of the lower tank 69″ greater enough which causes the liquid to move towards the higher tank 70″ which causes the container to again turn 180° to the previous original position as shown in FIG. 6. The container will continue to rotate 180° at a time in one direction as long as the means of force differential of the vapor 66″ is present.

A motor similar to the motor in FIG. 3 can be constructed to use power sources 30″ of the type shown in FIG. 6 rather than those 30 shown in FIG. 1. The construction and operation of the other members in the motor are identical with the following exceptions:

The release lever 46″ and hold lever 47″, although function the same as in the previously described motors, are in different positions as shown in FIG. 6 and are activated differently. As a container nears the end of its 180° rotation, the tank 69″ or 70″ increasing in altitude activates the release lever 46″ which releases another container from the arresting position. The tank 69″ or 70″ of the first container which is descending then activates its hold lever 47″ before the other container activates its release lever 46″.

Figure 7:
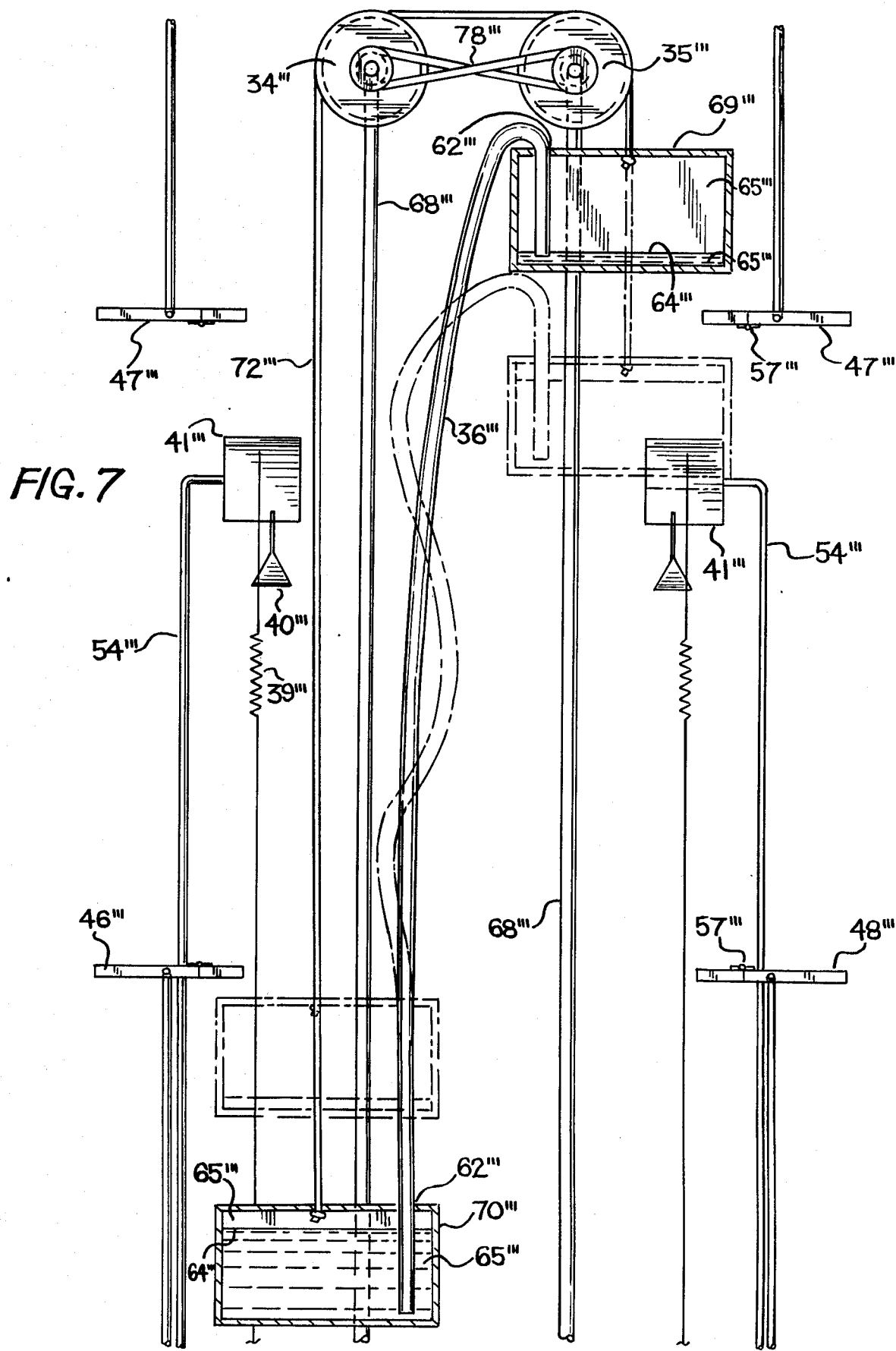

FIG. 7 shows the right side view of a power source 30‴ comprising a container comprising two tanks 69‴ % 70‴ which are identical, a flexible tube 36‴ each end of which extends through an opening 62‴ in and into a different tank 69‴ or 70‴. The tube 36‴ is joined to each tank 69‴ & 70‴ at each opening 62‴ in an airtight manner such that the two tanks 69‴ & 70‴ and the tube 36‴ form a sealed container with the tube 36‴ providing communication between the tanks 69‴ & 70‴.

The power source 30‴ also comprises a means of facilitating movement of the container such as a means comprising a flexible member such as a drive cable 72‴ and one or more movable members such as two pulleys 34‴ & 35‴ supported by a stand 68‴. Each end of the drive cable 72‴ is attached to a different tank 69‴ or 70‴, and the drive cable 72‴ is positioned on the pulleys 34‴ & 35‴ which support the drive cable 72‴ which supports the tanks 69‴ & 70‴. The drive cable 72‴ can be moved back and forth over the pulleys 34‴ & 35‴ as the tanks 69‴ & 70‴ alternate being at a higher altitude. This power source 30‴ has two original positions one of which is shown by the solid lines in FIG. 7. The other original position is the position at which the tank 69‴ shown at the higher altitude is at the lower altitude and the position at which the tank 70‴ shown at the lower altitude is at the higher altitude.

The power source 30‴ also comprises a volatile liquid 65‴ and the vapor 66‴ of the liquid 65‴, within the container, that meet at 64‴, and also comprises a means of force differential exerted by the vapor 66‴ in some or all portions of the container such that the force exerted in whichever tank 69‴ or 70‴ is at the higher altitude is lesser enough than the force in the lower tank. This causes the liquid 65‴ to move towards the higher tank. This causes the higher tank to over balance the lower tank such that the higher tank descends and the lower tank ascends as the container moves towards a position of balance.

The power source 30‴ also comprises a means of compelling the container to continue changing positions by preventing the tanks 69‴ & 70‴ from moving to a balance position before enough liquid 65‴ has moved into the higher tank to assure that the new balance position will not result in the tanks 69‴ & 70‴ remaining at approximately the same altitude in which case the vapor 66‴ in both tanks would exert the same force such that no liquid 65‴ would move to cause the container to move. Such a means comprises a counter lever 41‴ associated with each tank 69‴ or 70‴, a supporting member 54‴ about which the counter lever 41‴ pivots, a spring 39‴ that biases the counter lever 41‴ to pivot one way, and a weight 40‴ that biases it 41‴ to pivot the other way such that the spring 39‴ and the weight 40‴ keep one end of the counter lever 41‴ in the path of the tank 69‴ or 70‴ When the tank 69‴ or 70‴ is not in contact with its counter lever 41‴.

When the liquid 65‴ continues to move towards the higher tank 69‴, the higher tank 69‴ over balanced the lower tank 70‴ and the container moves to the arresting position as shown by the broken lines in FIG. 7. Before reaching the arresting position the higher tank 69‴ comes into contact with its counter lever 41‴. The higher tank biases it 41‴ to pivot the opposite way from the bias of the weight 40‴. When enough liquid enters the higher tank 69‴ to assure that equilibrium will be prevented, the higher tank 69‴ over balances the weight 40‴ and the container moves to the arresting position. If no other arresting member such as is in the motor is present, the higher tank 69‴ pushes the counter lever 41‴ out of its way. The higher tank 69‴ descends and the lower tank 70‴ ascends until the container is in the other original position. As the tanks move, the drive cable 72‴ rotates the pulleys 34‴ & 35‴.

The same amount of liquid is in the now lower tank 69‴ as was in the lower tank 70‴ of the other original position. The means of changing the force of the vapor causes the liquid 65‴ to move towards the now higher tank and the container moves back to the original position shown in FIG. 7 causing the pulleys 34‴ & 35‴ to rotate. This cycle of the container moving from one original position to the other continues as long as the means of force differential of the vapor 66‴ is present.

This power source operates the same with the tube 36''' attached at holes in the bottoms of the tanks 69''' & 70''' rather than extending through holes in the tops of the tanks 69''' & 70'''.

A motor similar to the motor in FIG. 3 can be constructed to use this power source 30'''. In this motor the kinetic member comprises two power shafts 32''', one of which extends through each pulley 34'''' & 35'''' of the power source 30''' such that the power shafts 32'''' are common to more than one power source 30''' in the motor. A ratchet mechanism, between each pulley 34'''' & 35'''' and its associated power shaft 32'''', is made such that when the tank 69''' or 70''' directly under a pulley 34'''' or 35'''' is descending, the pulley rotates the power shaft 32'''' extending through it. However, when the tank 69''' or 70''' is not descending, the pulley 34'''' or 35'''' directly over the tank has no effect on the movement of its associated power shaft 32''''. This causes the two power shafts 32'''' to rotate in opposite directions. A belt 78'''' is positioned in a "figure eight" around the power shafts 32'''' so that when either power shaft 32'''' rotates, the belt 78'''' rotates the other power shaft in the opposite direction.

As long as a tank 69''' or 70''' of at least one power source 30''' in the motor is descending, the power shafts will continuously rotate in opposite directions. An energy consuming device can be driven by either or both power shafts 32''''.

The operation and construction of the motor is the same as the motor shown in FIG. 3 with the following exceptions:

The arresting means comprises one arresting member, one hold lever 47''', and one release lever 46''' associated with each tank 69''' & 70''' rather than with each container.

Each hold lever 47''' and each release lever 46''' operates the same with respect to the arresting member as those 47 & 46 shown in FIG. 3. After a first container is released its descending tank 69''' activates a release lever 46''' releasing another container before the first container's ascending tank 70''' activates its hold lever 47'''. The ascending tank of the first container activates the hold lever 47''' before the other container's descending tank activates the release lever 46'''. The hold and release levers 47'''' & 46'''' are constructed in a way such that an ascending tank will not activate a release lever 46''' and such that a descending tank will not activate a hold lever 47''''. Each lever 46''' & 47''' is made in two parts with a hinge 57''' between the two parts which allows the part which has contact with a tank to be pushed out of the path of a tank without activating the lever 46''' or 47''' when a tank is ascending and contacts a release lever 46''' or when a descending tank contacts a hold lever 47''''. A hinge spring on the hinge 57''' keeps this part of the lever 47'''' & 46''' in the position shown in FIG. 7 after the tank 69''' or 70''' passes the lever 46''' or 47''''.

Each container has two arresting positions, and each tank has one arresting position.

I claim:

1. An apparatus which provides usable energy comprising:
   a. At least two devices that each move in a cycle such that the movement of each device is naturally independent of the other;
   b. means of effecting, before all devices have completed their cycles, that at least one device will begin its cycle comprising:
      an arresting member that can be placed in at least two conditions, one of which, the hold condition, prevents at least one device from moving past an arresting position, past which the device begins its cycle, and the other condition of which, the release condition, allows at least one device to move past the arresting position,
      a first activating member which, when activated by the movement of a device puts the arresting member in the hold condition such that a device moves to the arresting position before all devices have completed their cycles, and
      a second activating member which, when activated by the movement of a device, puts the arresting member in the release condition while at least one device is in the arresting position and before all devices have completed their cycles; and
   c. means of converting the movement of the devices into usable energy.

2. An apparatus which provides usable energy comprising:
   a. two or more thermodynamic power sources, each comprising
      a sealed hollow member,
      means of facilitating movement of the sealed hollow member,
      a first fluid within the sealed hollow member,
      a second fluid within the sealed hollow member such that the second fluid is less dense than the first fluid and exerts a force on the first fluid.
      means of effecting a great enough differential between the forces exerted by the second fluid in some or all portions of the sealed hollow member such that some or all of the first fluid moves towards those portions of the sealed hollow member which contain those portions of the second fluid exerting the least force on the first fluid such that the sealed hollow member becomes off balance and moves via the means facilitating movement towards a position of balance, and
      means of compelling the sealed hollow member to continue to change positions of balance as long as said means of effecting a great enough differential exists, by preventing the sealed hollow member from remaining in a position at which the force exerted by the second fluid will not cause the first fluid to move such that the sealed hollow member moves towards a balance position;
   b. a power shaft; and
   c. means of converting the movement of two or more power sources into the unidirectional rotary movement of the power shaft.

* * * * *